United States Patent [19]

Gall et al.

[11] Patent Number: 4,533,942
[45] Date of Patent: Aug. 6, 1985

[54] METHOD AND APPARATUS FOR REPRODUCING AN IMAGE WHICH HAS A COARSER RESOLUTION THAN UTILIZED IN SCANNING OF THE IMAGE

[75] Inventors: Winrich Gall, Klausdorf; Peter Weselmann, Hamburg, both of Fed. Rep. of Germany

[73] Assignee: Dr. -Ing. Rudolf Hell GmbH, Fed. Rep. of Germany

[21] Appl. No.: 493,817

[22] Filed: May 12, 1983

[30] Foreign Application Priority Data

May 28, 1982 [EP] European Pat. Off. ....... 82-104691.9

[51] Int. Cl.³ .................. H04N 1/46; H04N 5/14; H04N 1/40; G03F 3/10
[52] U.S. Cl. .................................. 358/78; 358/76; 358/160; 358/280
[58] Field of Search ............ 358/77, 287, 280, 283, 358/284, 180, 183, 140, 160, 75, 80, 76, 78

[56] References Cited

U.S. PATENT DOCUMENTS 4,127,870 11/1978 Colditz .................................. 358/77
4,240,113 12/1980 Michael et al. ..................... 358/180
4,447,831 5/1984 Adsett ................................ 358/283

Primary Examiner—John C. Martin
Assistant Examiner—Michael Dunnam
Attorney, Agent, or Firm—Hill, Van Santen, Steadman & Simpson

[57] ABSTRACT

Method and apparatus for the reproduction of an image with coarser resolution than used during scanning wherein the original image is opto-electronically scanned point-wise and line-wise with a prescribed resolution and is converted into digital image signals, and a field containing as many image points as is used for one coarse image point is extracted from the digital image signals, and wherein weighting is undertaken for the individual image signals of the image points of said field and a corresponding image signal for the coarse image point is obtained by means of combining the weighted image signals.

8 Claims, 4 Drawing Figures

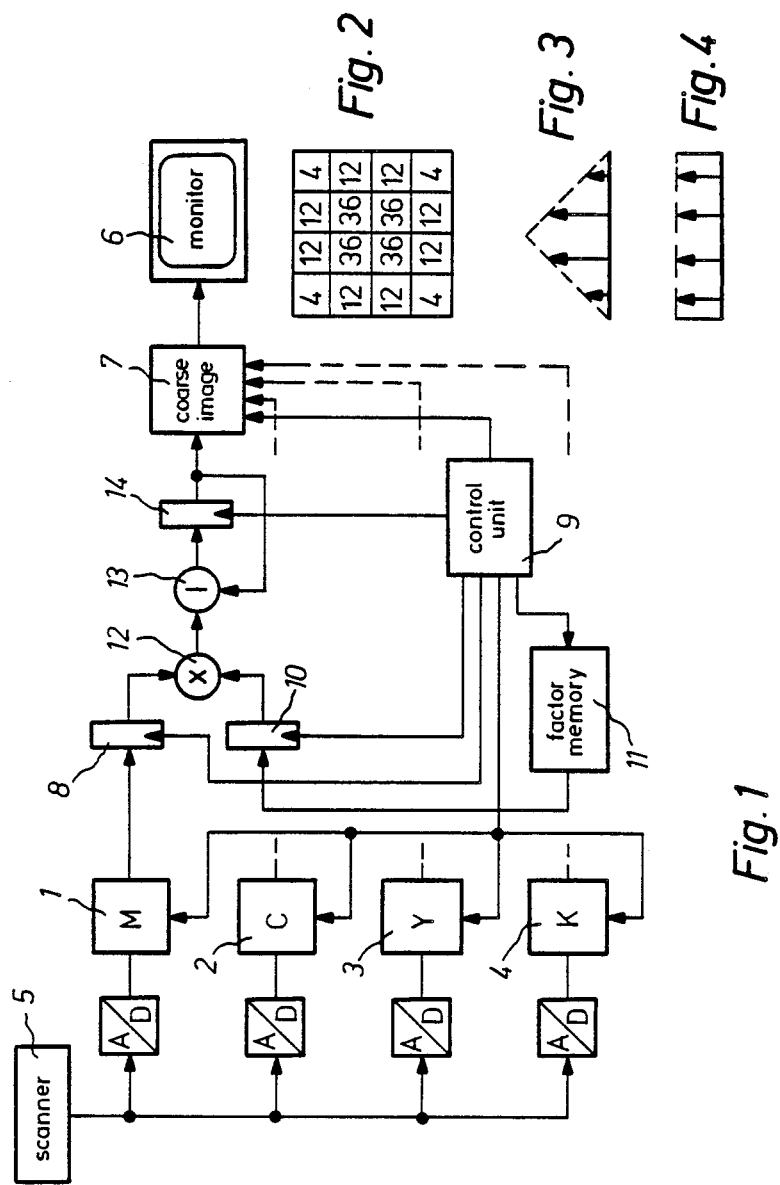

METHOD AND APPARATUS FOR REPRODUCING AN IMAGE WHICH HAS A COARSER RESOLUTION THAN UTILIZED IN SCANNING OF THE IMAGE

BACKGROUND OF THE INVENTION

1. Field of the Invention

The present invention relates in general to a method and apparatus for reproducing an image which has a coarser resolution than was used in scanning of the image wherein the original image is opto-electronically scanned point-wise and row-wise with a prescribed resolution and the image signals which are obtained are converted into digital image signals which are combined and reproduced on a monitor with a coarser resolution than was used in scanning. The invention relates in general to the field of image processing in printing technology and in particular to reproduction of images.

2. Description of the Prior Art

It is known in printing technology to optoelectronically scan an image using scanners and reproduce a printing form. Color corrections and gradation changes are made in processing the electronic image signals. The results of these corrections normally can be observed in the final printed product. However, in order to be able to judge before printing if the printing form meets the demands of quality which are to be obtained in the final reproduction, color value evaluation devices are employed and the color image is reproduced on a monitor so as to appear as closely as possible to the final print. For example, such apparatus is described in German AS No. 26 07 623. With such prior art devices, only one respective image can be displayed at a time which is in a format that corresponds to the size of the monitor or is smaller than the monitor.

It is desired in modern image processing systems to also display larger images or, respectively, image montages such as full pages and for this purpose the resolution of the monitor makes it necessary to correspondingly reduce the number of reproduced image points as compared to the resolution during scanning. German AS No. 27 12 025 discloses an arrangement for changing the format of a video image wherein the format change is accomplished by skipping individual lines. This system simply omits information. Such systems result in a deterioration of the image quality which is disadvantageous for purposes of printing technology in which extremely fine color corrections must still be made visible.

SUMMARY OF THE INVENTION

It is therefore an object of the present invention to provide a method and apparatus with which an image can be reproduced with a coarser resolution than the resolution used during the scanning of the image without a major loss of information. Images are scanned with a particular resolution and are then reproduced at a coarser resolution and the scanned information is converted into digital signals and are converted into a smaller number of coarse image points by weighting the individual image signals of the scanned image points and obtaining combined weighted image signals for the reproduced image points.

Other objects, features and advantages of the invention will be readily apparent from the following description of certain preferred embodiments thereof taken in conjuction with the accompanying drawing although variations and modifications may be effected without departing from the spirit and scope of the novel concepts of the disclosure and in which:

BRIEF DESCRIPTION OF THE DRAWINGS

FIG. 1 is a block diagram illustrating the invention;

FIG. 2 illustrates a field of image points used for generating a coarse image point;

FIG. 3 illustrates a triangular function for evaluating the surround field points for the formation of the coarse image points; and FIG. 4 illustrates an additional function for evaluation of the surrounding field points.

DESCRIPTION OF THE PREFERRED EMBODIMENTS

FIG. 1 comprises a block diagram illustrating the invention wherein images are to be reproduced opto-electronically by scanning point-wise and line-wise with prior art type scanners an original picture. The output of the scanner is stored in a memory in digital image signal form. The stored image signals can comprise individual images or can comprise entire magazine pages which have been corrected and completely assembled and which are to be reproduced as a coarse image on a color monitor. A scanner 5 of conventional type scans the images and produces output analog signals of magenta, cyan, yellow and black which are supplied through analog to digital converters to image memories 1, 2, 3 and 4 which respectively receive and store the magenta, cyan, yellow and black color separations. Thus, the color separation signals are stored in digitized form in the memories 1 through 4. The resolution of the scanner 5 corresponds to the resolution of the raster in the final print and are to be displayed on a monitor 6 with a coarser resolution than that used in the scanning.

For this purpose, the image memories 1, 2, 3 and 4 for the individual color separations are interconnected to a memory 7 through means and apparatus which converts the storage image signals into new image signals for the coarse image and the image signals for the coarse image are deposited in memory 7 so that they are available for video reproduction on the monitor 6 which occurs with a corresponding image repetition frequency. The image 7 can, for example, be a commercially available image refresh memory from which the image signals are continuously removed according to the television standard. For simplicity, the circuit for converting the fine image signals from the memories 1 through 4 into coarse image signals is illustrated for only one of the color separations, magenta, but it is to be realized, of course, that there are channels between the memories 2, 3, and 4 and the memory 7 which are similar to the channel between the memory 1 and the memory 7.

The memory 7 supplies an output to the monitor 6 and the scanner 5 and monitor 6 are commercially available units and, thus, detailed description of these equipments will not be given.

The fundamental conversion of the fine image into the coarse image or the overall layout image is accomplished such that a plurality of image points such as are formed with a coarse image or, respectively, overall layout image point is extracted from the digital image signals of the fine image. The number depends upon the scale of conversion between the fine image into the overall layout image. The image signals of the image points of the fine image are individually weighted or evaluated and are added to form a sum signal and the total single image signal value which is produced is representative for the overall image points in the field and this is forwarded for recording.

So as to accomplish this method, a first register 8 receives the magenta color separation signal from the memory 1 and receives a clock timing signal from the clock or control unit 9. A second register 10 receives an input from a further memory 11 in which are stored the weighting factors or evaluation factors for the individual signals for the individual image points of the field from which the respective coarse image point is to be formed. The further memory 11 and the second register 10 also receive clock input signals from the control unit 9 and the second register 10 is clocked synchronously with the first register 8.

The further memory 11 is controlled by the control unit 9 so that the corresponding factors can be read out of the memory 11 at the respective clock speed for the registers 8 and 10. The output of the registers 8 and 10 are supplied to a multiplier 12 where they are multiplied and supplied to an adder 13. The adder 13 supplies an output to a third register 14 which supplies an output to the coarse image memory 7 and also supplies an input to the second input of the adder 13. The register 14 is connected to the control unit 9 over a clock line.

The control unit 9 supplies the clock signals for writing image signals of the coarse image points into the memory 7. Correspondingly fast memories can also be employed as buffer memories for the registers 8, 10 and 14 if desired.

FIG. 2 illustrates a field having 4×4 image points for the fine image from which a coarse image point is to be generated. The evaluation and weighting factors are entered in these fields as numerical values with which the image signals of the individual image points of the fine image are to be weighted or evaluated. After evaluation or weighting, the individual image signals are summed up and the result represents the image signal of a single tonal or tint value which is representative of these coarse image points. In the circuit as shown in FIG. 1 this occurs such that the signal of one image point from the color separation memory 1 is supplied into the register 8 and at the same time the corresponding factor which is associated with this field of FIG. 2 is input into the register 10 and the image signal is multiplied by this factor in the multiplier 12. The results is forwarded to the adder 13 and the output signal of the adder is written into the register 14 by means of the control unit. The image signal of the next fine point is then forwarded into the register 8 and the corresponding factor is forwarded into the register 10 and the product from the multiplier 12 is again applied to the input of the adder 13. In the adder 13, the content of the register 14, in other words, the image signal of the preceeding image point evaluated or weighted with its factor is then added through the feedback loop which is the connection of the output of the register 14 to the second input of the adder 13. The results are again stored in the register 14. The same sequence occurs for the next image point until all image signals of the field of FIG. 2 are evaluated or weighted and have been combined into a new image signal. At the last image point of the field of FIG. 2, this signal is input into the memory 7. It should be noted that a value which is far too high for the image signal of the coarse image points results due to this constant multiplication and adding of the signals. Since this signal exists in digital form, this error can be easily corrected in that only the lines for the more significant bits are supplied from the register 14 to the memory 7 so that the remaining bits are eliminated. The memory 7 can be designed such that an image signal memory is provided for each color separation. However, only a single large memory can be employed for the other three colors, cyan, yellow and black since a large memory will have enough memory regions with sufficient capacity for accepting the image signals for the coarse image.

It is also possible to accomplish matching of the respective coarse image points to the actual value of the image signal between the coarse image memory and the monitor by using a multiplexer which selects the corresponding most significant bits, for example, eight bits through twenty-four bits which is provided between the coarse image memory and the monitor.

FIG. 3 illustrates a triangular function in accordance with which the evaluation or weighting of the image points of the fine image can be accomplished with a decreasing tendency and value preceeding from the center of the field of FIG. 2. Another possibility for the evaluation or weighting of the image signals of the image points of the field to with an identical factor is illustrated in FIG. 4. Thus, when using the weighting factors of FIG. 4, all of the image points would be multiplied by the same factor.

It is to be realized that the size of the field illustrated in FIG. 2 can assume any other desired value when a corresponding difference scale factor is required between the fine image and the overall layout image. A corresponding larger or smaller number of fine image points must then be converted into a single coarse image point. Then stepped factors for the evaluation or weighting of the image signals of the respective employed field of fine image points preceeding from the center can be used as illustrated in FIG. 3 or, alternatively, the same image weighting factor can be used as illustrated in FIG. 4 for a field of 4×4 fine image points.

Other suitable functions such as evaluation according to a sin x/X function or a cos-function or $\cos^2$ function or other suitable functions can also be utilized.

The scanner 5 and monitor 6 may be commercially available units and are not described in detail herein. Each of the memories 2, 3 and 4 also have similar coarse image point converters between them and the memory 7 as is illustrated for the magenta signal path.

Although the invention has been described with respect to preferred embodiments, it is not to be so limited as changes and modifications can be made which are within the full intended scope of the invention as defined by the appended claims.

We claim as our invention:

1. The method for reproducing images with a coarser resolution than the image, which is scanned, whereby the original image is opto-electronically scanned pointwise and line-wise with a predetermined resolution to obtain digital image signals, wherein a field which contains as many fine image points as are included in a coarse image point is extracted from the digital image signals, wherein the individual image signals of the fine image points of said field are weighted with a weighting function and wherein the weighted image signals are combined to obtain the image signal for a coarse image point, the weighting and combination of the image signals comprising, serially weighting the fine image points point by point, storing the first weighted image signal, reading out the first weighted image signal, adding and storing the second weighted image signal to the previously read out first weighted image signal, reading out the sum of the first and second weighted signals, adding and storing the sum of the first and second weighted signals with the next weighted signal and repeating this reading out and adding process until the last weighted image signal of the field is processed and weighting the final sum of the weighted fine image points according to the number of the fine image points of the field.

2. The method according to claim 1, characterized in that the weighting function increases from the edge of the field toward the center of the field.

3. The method according to claim 1, characterized in that the weighting function has a triangular shape.

4. The method according to claim 1, characterized in that all image points of the field are weighted with an approximately identical factor.

5. The method for reproducing images with a coarser resolution than the image which is scanned, whereby the original image is opto-electronically scanned point-wise and line-wise with a predetermined resolution to obtain digital image signals, characterized in that a field which contains as many fine image points as are included in a coarse image point is extracted from the digital image signals; weighting with a weighting function the individual image signals of the image points of said field; and by combining the weighted image signals to obtain the image signal for a coarse image point, characterized in that the weighting function increases from the edge of the field toward the center of the field, and characterized in that the weighting function is sin x/x.

6. Apparatus for reproducing images with a coarser resolution than the image, which is scanned, whereby the original image is opto-electronically scanned point-wise and line-wise with a predetermined resolution to obtain digital image signals, wherein a field which contains as many fine image points as are included in a coarse image point is extracted from the digital image signals, wherein the individual image signals of the fine image points of said field are weighted with a weighting function and wherein the weighted image signals are combined to obtain the image signal for a coarse image point, the weighting and combination of the image signals comprising, serially weighting the fine image points point by point, storing the first weighted image signal, reading out the first weighted image signal, adding and storing the second weighted image signal to the previously read out first weighting image signal, reading out the sum of the first and second weighted signals, adding and storing the sum of the first and second weighted signals with the next weighted signal and repeating this reading out and adding process until the last weighted image signal of the field is processed and weighting the final sum of the weighted fine image points according to the number of the fine image points of the field comprising, a scanner, a plurality of color separation memories receiving outputs of said scanner, a first intermediate memory connected, respectively, to each of said color separation memories, a second intermediate memory, a multiplier receiving inputs from said first and said second intermediate memories, a further memory which contains weighting factors for the individual image points of the field surrounding the coarse image point supplying inputs to said second intermediate memory, a single adder receiving the output of said multiplier, a third intermediate memory receiving the output of said adder and supplying an input to said adder, a coarse image memory receiving the output of said third intermediate memory, a clock control unit connected to said plurality of color separation memories, said first, second and third intermediate memories, said further memory and said coarse image memory to transfer signals therebetween, and a monitor connected to said coarse image memory.

7. Apparatus according to claim 6, wherein data is transferred between the third intermediate memory and the coarse image memory only for the more significant bits of the output signal of said third intermediate memory in order to reduce the input signal for the coarse image memory to the actual value of the image signal of the respective coarse image point.

8. Apparatus according to claim 6, wherein the connection between the coarse image memory and said monitor is designed such that the transmission of the more significant bits of the output signal of the coarse image memory to the monitor occurs in order to reduce the input signal to the monitor to the actual value of the image signal of the respective coarse image point.

* * * * *